US010128972B2

(12) United States Patent
Yuk et al.

(10) Patent No.: US 10,128,972 B2
(45) Date of Patent: Nov. 13, 2018

(54) METHOD FOR CONVERTING WAVELENGTH OF OPTICAL SIGNAL IN PASSIVE OPTICAL NETWORK

(71) Applicant: Lightron Fiber-Optic Devices Inc., Daejeon (KR)

(72) Inventors: Soo Yuk, Daejeon (KR); Taek Hyung Kim, Gongju-si (KR); Young-Un Heo, Sejong-si (KR); Sung Jin Park, Daejeon (KR)

(73) Assignee: Lightron Fiber-Optic Devices Inc., Daejeon (KR)

( * ) Notice: Subject to any disclaimer, the term of this patent is extended or adjusted under 35 U.S.C. 154(b) by 0 days.

(21) Appl. No.: 15/879,598

(22) Filed: Jan. 25, 2018

(65) Prior Publication Data

US 2018/0212703 A1    Jul. 26, 2018

(30) Foreign Application Priority Data

Jan. 26, 2017 (KR) ........................ 10-2017-0013018

(51) Int. Cl.
*H04B 17/00* (2015.01)
*H04J 14/02* (2006.01)
*H01S 3/13* (2006.01)
*H04B 10/50* (2013.01)

(52) U.S. Cl.
CPC ........ *H04J 14/0223* (2013.01); *H01S 3/1301* (2013.01); *H04B 10/506* (2013.01); *H04J 14/023* (2013.01); *H04J 14/0282* (2013.01)

(58) Field of Classification Search
CPC .. H04J 14/0223; H04J 14/023; H04J 14/0282; H04B 10/506
USPC ........................................................ 398/9, 34
See application file for complete search history.

(56) References Cited

U.S. PATENT DOCUMENTS

| 6,862,302 | B2* | 3/2005 | Chieng | H01S 5/06804 372/25 |
| 8,295,704 | B2* | 10/2012 | Vogel | H01S 5/0612 372/32 |
| 2007/0172169 | A1 | 7/2007 | Kish, Jr. et al. | |
| 2009/0317091 | A1 | 12/2009 | Vogel | |

FOREIGN PATENT DOCUMENTS

| KR | 1020130018465 A | 2/2013 |
| KR | 1020160083125 A | 7/2016 |

\* cited by examiner

*Primary Examiner* — Tesfaldet Bocure
(74) *Attorney, Agent, or Firm* — The Webb Law Firm (57) ABSTRACT

According to the present disclosure, a controlling unit arbitrarily determines a current set temperature of a temperature setting unit to cause a light generating unit connected to the temperature setting unit to generate an optical signal having a wavelength according to the current set temperature, thereby making it possible to effectively reduce a wavelength overlap phenomenon that may occur when a plurality of R-ONUs in a passive optical network simultaneously transmit the optical signals.

6 Claims, 4 Drawing Sheets

METHOD FOR CONVERTING WAVELENGTH OF OPTICAL SIGNAL IN PASSIVE OPTICAL NETWORK

CROSS-REFERENCE TO RELATED APPLICATION

This application claims priority to Korean Patent Application No. 10-2017-0013018 filed Jan. 26, 2017, the disclosure of which is hereby incorporated in its entirety by reference.

TECHNICAL FIELD

The following disclosure relates to a method for converting a wavelength of an optical signal in a passive optical network in which a controlling unit included in an R-ONU in the passive optical network is configured to determine a current set temperature of a temperature setting unit based on an external temperature sensed by a temperature sensor, and a light generating unit is configured to generate an optical signal having a wavelength according to the current set temperature of the temperature setting unit.

BACKGROUND

In recent years, in order to smoothly use satellite broadcasting, CATV broadcasting, and VOD broadcasting, the spread of a passive optical network based on a radio frequency (RF) (radio frequency over glass: RFoG) and a development of a fiber-to-the-home (FTTH) system based on the RF are actively made. The RFoG replaces a coaxial portion in a hybrid fiber coax (HFC) network with a single-fiber passive optical network (PON), and the FTTH system used in the passive optical network is advantageous in that it allows subscribers to use their own cable modems, set-top boxes, and the like without change.

In general, the passive optical network has a structure in which a plurality of house-optical network units (hereinafter, referred to as 'R-ONU') disposed at a plurality of subscribers' side are coupled to one optical core, and a laser diode included in each R-ONU uses a burst mode for uplink optical signal transmission. That is, only in a case in which the RF signal is input to the R-ONU from the cable modem or the set-top box of the subscriber, the R-ONU is operated to transmit the optical signal to a central station side from the subscriber side, and in the opposite case, since the R-ONU is not operated, the uplink optical signal is not transmitted.

In a case in which the RF signal is simultaneously input to the plurality of R-ONUs, however, the RF signal activates the laser diode to generate an optical signal having a specific wavelength from the activated laser diode, and the generated optical signal is simultaneously transmitted to the central station side from the plurality of R-ONUs. When the uplink optical signal having the same wavelength is simultaneously transmitted from the plurality of R-ONUs as described above, a wavelength overlap phenomenon called optical beat interference (OBI) may occur, which results in a quality degradation phenomenon of the uplink signal. That is, in a case in which a plurality of optical signals having wavelengths which are very close to each other at the same time overlap within a single optical fiber, a noise level of an uplink receiving terminal may be increased and a network service itself may become impossible.

RELATED ART DOCUMENT

Patent Document (Patent Document 1) US Patent Application Publication No. 2007-0172169 (published on Jul. 26, 2007)

SUMMARY

An embodiment of the present invention is directed to providing a method capable of converting a wavelength of an optical signal generated from a light generating unit of an R-ONU in order to minimize a wavelength overlap phenomenon that may occur when a plurality of R-ONUs in a passive optical network simultaneously transmit optical signals.

Further, an embodiment of the present invention is directed to providing a method for converting a wavelength capable of reducing possibility of causing a temperature setting unit, and an R-ONU to be damaged or malfunctioned.

In one general aspect, a method for converting a wavelength of an optical signal by a controlling unit included in an R-ONU in a passive optical network includes: (a) calculating an initial external temperature sensed by a temperature sensor; (b) determining an operation range of a temperature setting unit that corresponds to the initial external temperature; (c) determining an arbitrary temperature belonging to the operation range of the temperature setting unit that corresponds to the initial external temperature, as an initial set temperature of the temperature setting unit; and (d) when a radio frequency (RF) signal is input from the outside, determining a temperature obtained by applying an arbitrary offset temperature to the initial set temperature as a current set temperature of the temperature setting unit to cause a light generating unit connected to the temperature setting unit to generate an optical signal having a wavelength according to the current set temperature.

In the operation (d), the current set temperature of the temperature setting unit may be determined within the operation range of the temperature setting unit that corresponds to the initial external temperature.

In another general aspect, a method for converting a wavelength of an optical signal by a controlling unit included in an R-ONU in a passive optical network includes: (a) calculating an initial external temperature sensed by a temperature sensor; (b) determining an operation range of a temperature setting unit that corresponds to the initial external temperature; (c) determining an arbitrary temperature belonging to the operation range of the temperature setting unit that corresponds to the initial external temperature, as an initial set temperature of the temperature setting unit; (d) calculating a current external temperature sensed by the temperature sensor; (e) determining whether or not a difference between the initial external temperature and the current external temperature is a predetermined value or more; (f) when it is determined that the difference between the initial external temperature and the current external temperature is the predetermined value or more, re-determining an arbitrary different temperature belonging to the operation range of the temperature setting unit as an initial set temperature; and (g) when a radio frequency (RF) signal is input from the outside, determining a temperature obtained by applying an arbitrary offset temperature to the initial set temperature which is re-determined in the operation (f) as a current set temperature of the temperature setting unit to cause a light generating unit connected to the temperature setting unit to generate an optical signal having a wavelength according to the current set temperature.

In the operation (g), the current set temperature of the temperature setting unit may be determined within the operation range of the temperature setting unit that corresponds to the initial external temperature.

In another general aspect, a method for converting a wavelength of an optical signal by a controlling unit included in an R-ONU in a passive optical network includes: (a) calculating an initial external temperature sensed by a temperature sensor; (b) determining an operation range of a temperature setting unit that corresponds to the initial external temperature; (c) determining an arbitrary temperature belonging to the operation range of the temperature setting unit that corresponds to the initial external temperature, as an initial set temperature of the temperature setting unit; (d) calculating a current external temperature sensed by the temperature sensor; (e) determining whether or not the current external temperature corresponds to the operation range of the temperature setting unit that corresponds to the initial external temperature; (f) when it is determined that the current external temperature corresponds to an operation range which is different from the operation range of the temperature setting unit that corresponds to the initial external temperature, re-determining an arbitrary temperature belonging to the different operation range as an initial set temperature of the temperature setting unit; and (g) when a radio frequency (RF) signal is input from the outside, determining a temperature obtained by applying an arbitrary offset temperature to the initial set temperature which is re-determined in the operation (f) as a current set temperature of the temperature setting unit to cause a light generating unit connected to the temperature setting unit to generate an optical signal having a wavelength according to the current set temperature.

In the operation (g), the current set temperature of the temperature setting unit may be determined within the operation range of the temperature setting unit that corresponds to the current external temperature.

DETAILED DESCRIPTION OF MAIN ELEMENTS

100: R-ONU
110: light generating unit
120: temperature setting unit
130: temperature sensor
140: controlling unit

DETAILED DESCRIPTION OF EMBODIMENTS

Hereinafter, the present invention will be described in detail with reference to the accompanying drawings. A detailed description of known functions and configurations that may unnecessarily obscure the gist of the present invention will be omitted.

Figure 1:
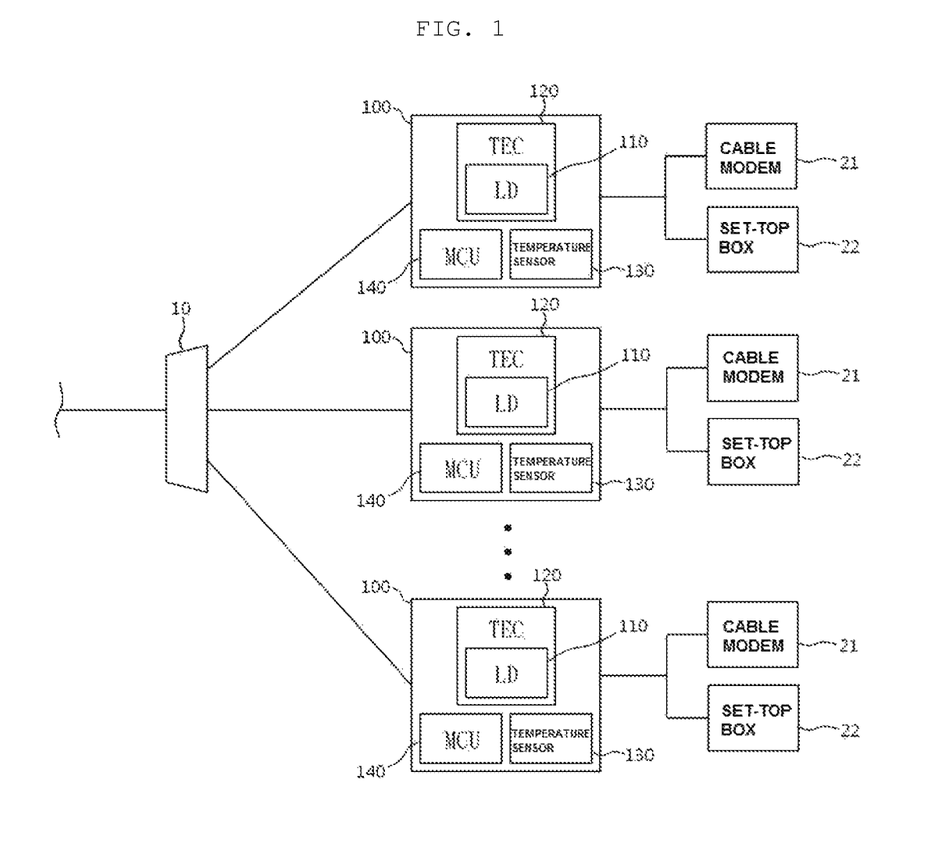
FIG. 1 is a view schematically illustrating a passive optical network including R-ONUs.

FIG. 1 is a view schematically illustrating a passive optical network including R-ONUs. As illustrated in FIG. 1, a plurality of R-ONUs 100 are connected to a distributor 10 by an optical fiber, and are also connected to cable modems 21 or set-top boxes 22 by a coaxial cable.

A head end HE (not shown) transmits a radio frequency (RF) signal to the cable modem 21 or the set-top box 22 of a subscriber through the optical fiber configuring an RFoG network, and in this case, the RF signal is distributed to each of the R-ONUs 100 by the distributor 10. Here, the distributor 10 may be a splitter.

However, unlike the transmission of a downlink optical signal performed as described above, in a case in which the optical signals having wavelengths which are very close to each other in the plurality of R-ONUs are transmitted toward the head end side via the distributor 10, a wavelength overlap phenomenon called optical beat interference OBI may occur.

Therefore, the present invention suggests a method for converting a wavelength of an optical signal in a passive optical network, and in order to implement the method, the R-ONU 100 in the passive optical network may include a light generating unit 110, a temperature setting unit 120, a temperature sensor, and a controlling unit 140.

The light generating unit 110 may be a laser diode or include the laser diode, and serve to generate an optical signal having a wavelength which is varied depending upon a temperature. Depending upon a design of the laser diode, a center wavelength of the optical signal generated by the laser diode to transmit an uplink optical signal is generally changed by approximately 0.1 nm/° C. Accordingly, a description will be provided below under an assumption that the center wavelength of the optical signal generated by the light generating unit 110 is changed by 0.1 nm/° C.

Meanwhile, the total number of subscriber channels may be or more, and a range of the center wavelength used as the uplink optical signal is significantly limited as compared to the subscriber channels as described above. Therefore, according to the present invention, a temperature of the light generating unit 110 is set and controlled through the temperature setting unit 120, the temperature sensor 130, and the controlling unit 140, such that the wavelength of the optical signal generated by the light generating unit 110 is converted according to a situation.

The temperature setting unit 120 is thermally connected to the light generating unit 110, and serves to set the temperature of the light generating unit 110 to operate the light generating unit 110. The temperature setting unit 120 may include a thermo electric cooler (TEC), and may also include a thermo electric cooler (TEC) driver to drive the thermo electric cooler. Here, the TEC driver serves to set a temperature of the thermo electric cooler by a control of the controlling unit 140 to be described below.

According to the present invention, the controlling unit 140 controls a set temperature (an initial set temperature and a current set temperature) of the temperature setting unit 120 based on an external temperature sensed by the temperature sensor 130. The temperature sensor 130 senses a temperature outside the R-ONU 100 and transfers the sensed temperature to the controlling unit 140, and in this case, the controlling unit 140 may calculate the temperature outside the R-ONU 100 (i.e., the external temperature) sensed by the temperature sensor 130 through a change in an electric resistance value of a thermistor included in the controlling unit 140 and an operation processing of the change in the electric resistance value, for example.

Hereinafter, a method for minimizing a wavelength overlap phenomenon that may occur when the uplink optical signal is transmitted through the R-ONU 100 including the above-mentioned configurations will be described.

Figure 2:
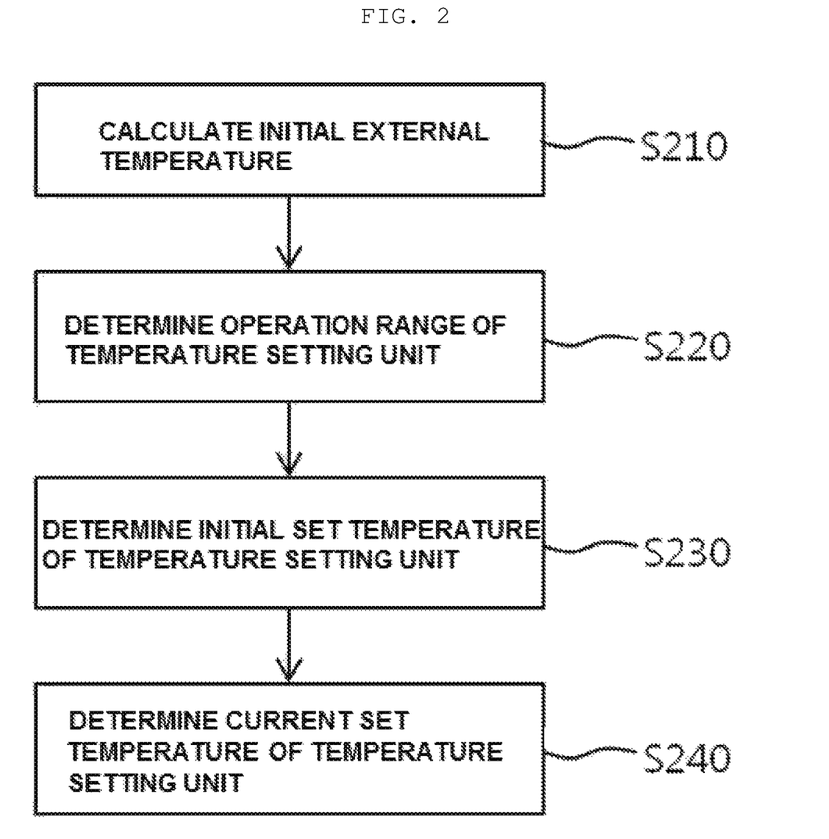
FIG. 2 is a flow chart illustrating a method for converting a wavelength of an optical signal according to a first exemplary embodiment of the present invention.

FIG. 2 is a flow chart illustrating a method for converting a wavelength of an optical signal according to a first exemplary embodiment of the present invention.

Referring to FIG. 2, in a method for converting a wavelength of an optical signal according to a first exemplary embodiment of the present invention, first, an operation (S210) of calculating, by the controlling unit 140, an initial external temperature sensed by the temperature sensor 130 is performed. Here, the initial external temperature sensed by the temperature sensor 130 may be an external temperature at a point of time which is defined by the subscriber (e.g., an external temperature at a point of time at which power is applied to the R-ONU may be set as the initial external temperature).

Next, the controlling unit 140 determines an operation range of the temperature setting unit 120 that corresponds to the initial external temperature (S220), and this is to minimize possibility of an overlap occurrence between a wavelength of an optical signal generated by any one R-ONU 100 and wavelengths of optical signals generated by other R-ONUs 100 by limiting a movement range of the wavelength of the optical signal generated by the light generating unit 110.

An example in which the controlling unit 140 determines the operation range of the temperature setting unit 120 that corresponds to the initial external temperature will be described as follows.

The thermo electric cooler configuring the temperature setting unit 120 is generally operable in a temperature range of 10° C. or more to 70° C. or less, and accordingly, the controlling unit 140 may classify the operation range of the temperature setting unit 120 into three ranges such as 50° C. or more to 70° C. or less (hereinafter, referred to as 'first operation range'), 30° C. or more to less than 50° C. (hereinafter, referred to as 'second operation range'), and 10° C. or more to less than 30° C. (hereinafter, referred to as 'third operation range').

Meanwhile, the R-ONU 100 may be exposed to the external temperature of −40° C. or more to 60° C. or less (such a range of the external temperature corresponds to the range of the external temperature sensed by the temperature sensor 130), and accordingly, the controlling unit 140 may previously store a table that matches the range of the external temperature sensed by the temperature sensor 130 to the operation range of the temperature setting unit 120.

Specifically, the controlling unit 140 may store an external temperature of 50° C. or more sensed by the temperature sensor 130 so as to correspond to the first operation range, store an external temperature of 30° C. or more to less than 50° C. sensed by the temperature sensor 130 so as to correspond to the second operation range, and store an external temperature which is less than 30° C. sensed by the temperature sensor 130 so as to correspond to the third operation range.

Accordingly, in S210, if the initial external temperature sensed by the temperature sensor 130 is 15° C., the controlling unit 140 determines the operation range of the temperature setting unit 120 that corresponds to 15° C. as the third operation range, and if the initial external temperature sensed by the temperature sensor 130 is 35° C., the controlling unit 140 determines the operation range of the temperature setting unit 120 that corresponds to 35° C. as the second operation range. Here, it is advantageous in terms of securing a lifetime of the temperature setting unit 120 that the controlling unit 140 matches the external temperature sensed by the temperature sensor 130 and the operation range of the temperature setting unit 120 to each other as close as possible to operate the temperature setting unit 120 at a temperature similar to the external temperature.

Next, the controlling unit 140 determines an arbitrary temperature belonging to the operation range of the temperature setting unit 120 that corresponds to the initial external temperature, as an initial set temperature of the temperature setting unit 120 (S230). As in the example described above, if the controlling unit 140 determines the operation range of the temperature setting unit 120 as the third operation range, the controlling unit 140 determines an arbitrary temperature (e.g., 25° C.) belonging to a range of 10° C. or more to less than 30° C. as the initial set temperature of the temperature setting unit 120. As such, the controlling unit 140 arbitrarily determines the initial set temperature of the temperature setting unit 120 to minimize the phenomenon that the wavelengths of the optical signals generated by the R-ONUs 100 included in the respective subscribers' side overlap with each other.

The initial set temperature of the temperature setting unit 120 means a reference wavelength of the optical signal generated by the light generating unit 110. That is, when it is assumed that the initial set temperature of the temperature setting unit 120 which is determined by the controlling unit 140 is 25° C., the light generating unit 110 may generate the optical signal having a center wavelength $\lambda c$ (reference wavelength). However, it is noted that the light generating unit 110 according to the present invention does not generate the optical signal depending upon the initial set temperature, but generates the optical signal depending upon the current set temperature.

After S230, when an RF signal is input to the controlling unit 140 from the outside, the controlling unit 140 determines a temperature obtained by applying an arbitrary offset temperature to the initial set temperature as the current set temperature of the temperature setting unit 120 to cause the light generating unit 110 connected to the temperature setting unit 120 to generate an optical signal having a wavelength according to the current set temperature (S240).

If the controlling unit 140 determines the initial set temperature of the temperature setting unit 120 included in the R-ONU 100 of a subscriber side of a first channel as 25° C., the controlling unit 140 may apply an offset temperature of +3° C. to the initial set temperature. Accordingly, the current set temperature of the temperature setting unit 120 becomes 28° C., and as a result, the center wavelength of the optical signal generated by the light generating unit 110 becomes $\lambda c+0.3$ nm.

If the controlling unit 140 determines the initial set temperature of the temperature setting unit 120 included in the R-ONU 100 of a subscriber side of a second channel as 25° C., the controlling unit 140 may apply the offset temperature of −5° C. to the initial set temperature. Accordingly, the current set temperature of the temperature setting unit 120 becomes 20° C., and as a result, the center wavelength of the optical signal generated by the light generating unit 110 becomes $\lambda c-0.5$ nm.

Here, it is preferable that the offset temperature applied to the initial set temperature of the temperature setting unit 120 by the controlling unit 140 is within 10° C., and this is to minimize a phenomenon that a wavelength of an optical signal generated by any one R-ONU 100 overlaps with a wavelength of an optical signal generated by the R-ONU 100 having an initial set temperature which is determined differently from any one R-ONU 100 by allowing the center wavelength of the optical signal to be converted within only 1 nm.

In addition, when the controlling unit 140 applies an arbitrary offset temperature to the initial set temperature to determine the current set temperature of the temperature setting unit 120, it is preferable that the offset temperature is determined within the operation range (in the above example, the third operation range) of the temperature setting unit 120 that corresponds to the initial external temperature. This is to avoid the wavelength overlap phenomenon with other R-ONUs 100 that generate the wavelengths of the optical signals depending upon the temperature belonging to other operation ranges (the first operation range or the second operation range) by allowing the wavelength of the optical signal generated by any one R-ONU 100 to be generated depending upon only the temperature belonging to, for example, the third operation range.

Figure 3:
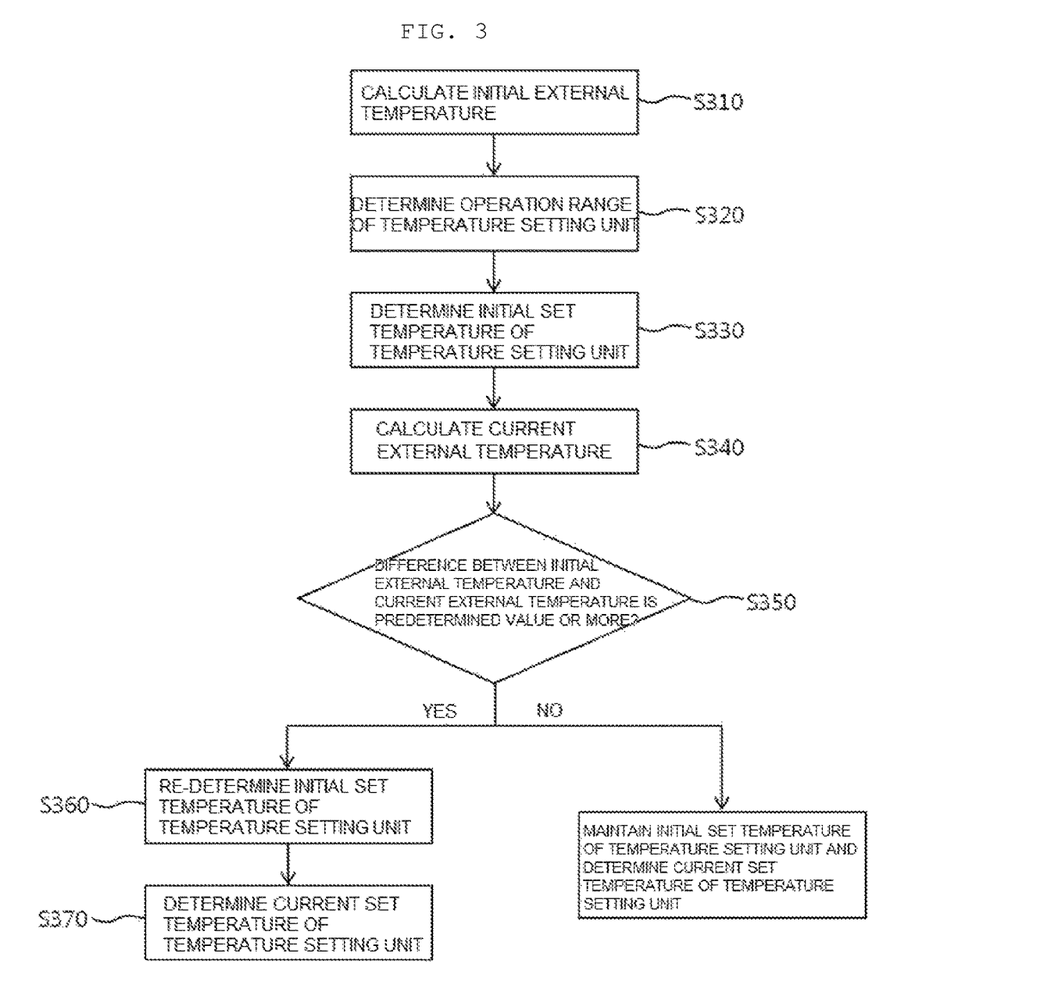
FIG. 3 is a flow chart illustrating a method for converting a wavelength of an optical signal according to a second exemplary embodiment of the present invention.

FIG. 3 is a flow chart illustrating a method for converting a wavelength of an optical signal according to a second exemplary embodiment of the present invention.

Referring to FIG. 3, in a method for converting a wavelength of an optical signal according to a second exemplary embodiment of the present invention, first, the controlling unit 140 calculates the initial external temperature sensed by the temperature sensor 130 (S310), and then determines the operation range of the temperature setting unit 120 that corresponds to the initial external temperature (S320). Next, the controlling unit 140 determines an arbitrary temperature belonging to the operation range of the temperature setting unit 120 that corresponds to the initial external temperature, as the initial set temperature of the temperature setting unit 120 (S330). Since the operations of the method for converting the wavelength of the optical signal according to the second exemplary embodiment of the present invention performed in this order are the same as the operations (S210 to S230) described above in the method for converting the wavelength of the optical signal according to the first exemplary embodiment of the present invention, a detailed description thereof will be omitted.

In the method for converting the wavelength of the optical signal according to the second exemplary embodiment of the present invention, after S330, an operation (S340) of calculating, by the controlling unit 140, a current external temperature sensed by the temperature sensor 130 is performed. The operation (S340) is performed to change the initial set temperature of the temperature setting unit 120 performed in the operation (S330) when a temperature difference between the current external temperature and the initial external temperature sensed by the temperature sensor 130 in the operation (S310) is large.

Accordingly, after S340, the controlling unit 140 determines whether or not a difference between the initial external temperature and the current external temperature (or an absolute value of the difference between the initial external temperature and the current external temperature) is a predetermined value or more (S350).

As a result of determination of the controlling unit 140, when the difference between the initial external temperature and the current external temperature is less than the predetermined value, the controlling unit 140 maintains the initial set temperature of the temperature setting unit 120 determined in the operation (S330), and after S330, when the RF signal is input to the controlling unit 140 from the outside, the controlling unit 140 determines a temperature obtained by applying an arbitrary offset temperature to the initial set temperature determined in the operation (S330) as the current set temperature of the temperature setting unit 120 to allow the light generating unit 110 connected to the temperature setting unit 120 to generate an optical signal having a wavelength according to the current set temperature.

Here, it is preferable that the offset temperature applied to the initial set temperature of the temperature setting unit 120 by the controlling unit 140 is within 10° C., and this is to minimize a phenomenon that a wavelength of an optical signal generated by any one R-ONU 100 overlaps with a wavelength of an optical signal generated by the R-ONU 100 having an initial set temperature which is determined differently from any one R-ONU 100 by allowing the center wavelength of the optical signal to be converted within only 1 nm.

In addition, when the controlling unit 140 applies an arbitrary offset temperature to the initial set temperature to determine the current set temperature of the temperature setting unit 120, it is preferable that the offset temperature is determined within the operation range (for example, the third operation range) of the temperature setting unit 120 that corresponds to the initial external temperature. This is to avoid the wavelength overlap phenomenon with other R-ONUs 100 that generate the wavelengths of the optical signals depending upon the temperature belonging to other operation ranges (the first operation range or the second operation range) by allowing the wavelength of the optical signal generated by any one R-ONU 100 to be generated depending upon only the temperature belonging to, for example, the third operation range.

Meanwhile, as a result of determination of the controlling unit 140, when the difference between the initial external temperature and the current external temperature (or the absolute value of the difference between the initial external temperature and the current external temperature) is the predetermined value or more, the controlling unit 140 re-determines an arbitrary different temperature belonging to the operation range of the temperature setting unit 120 determined in the operation (S320) as the initial set temperature of the temperature setting unit 120 (S360).

For example, it may be assumed that the initial external temperature calculated in the operation (S310) by the controlling unit 140 is 15° C., the controlling unit 140 determines the operation range of the temperature setting unit 120 as the third operation range in the operation (S320) accordingly, and the controlling unit 140 determines the initial set temperature of the temperature setting unit 120 as 25° C. in the operation (S330) accordingly. In addition, when it is assumed that the controlling unit 140 calculates the current external temperature as 5° C. in the operation (S340), the controlling unit 140 may perform the same determination operation as the operation (S350).

When the predetermined value which is previously set by the controlling unit 140 is 5° C., the controlling unit 140 may determine that a difference between the initial external temperature (15° C.) and the current external temperature (5° C.) is the predetermined value or more. In this case, the controlling unit 140 re-determines an arbitrary different temperature (10° C.) belonging to the third operation range as the initial set temperature of the temperature setting unit 120, which means that the reference wavelength of the optical signal generated by the light generating unit 110 is converted. That is, depending upon the initial set temperature (25° C.) of the temperature setting unit 120 which is determined in the operation (S330), the center wavelength λc in the light generating unit 110 is the reference wavelength, but depending upon the initial set temperature (10° C.) which is re-determined in the operation (S360), the center wavelength λc−1.5 nm in the light generating unit 110 is the reference wavelength.

Through the operations as described above, the initial set temperature of the temperature setting unit 120 is re-determined, thereby making it possible to minimize the phenomenon that the wavelengths generated by the plurality of R-ONUs 100 overlap with each other even in a case in which a change in the external temperature is large.

After S360, when an RF signal is input to the controlling unit 140 from the outside, the controlling unit 140 determines a temperature obtained by applying an arbitrary offset temperature to the initial set temperature which is re-determined in the operation (S360) as the current set temperature of the temperature setting unit 120 to cause the light generating unit 110 connected to the temperature setting unit 120 to generate an optical signal having a wavelength according to the current set temperature (S370).

If the controlling unit 140 re-determines the initial set temperature of the temperature setting unit 120 included in the R-ONU 100 of a subscriber side of a first channel as 10° C. after performing the operation (S360), the controlling unit 140 may apply an offset temperature of +5° C. to the initial set temperature. Accordingly, the current set temperature of the temperature setting unit 120 becomes 15° C., and as a result, the center wavelength of the optical signal generated by the light generating unit 110 becomes λc−1 nm.

Here, it is preferable that the offset temperature applied to the initial set temperature of the temperature setting unit 120 by the controlling unit 140 is within 10° C., and this is to minimize a phenomenon that a wavelength of an optical signal generated by any one R-ONU 100 overlaps with a wavelength of an optical signal generated by the R-ONU 100 having an initial set temperature which is determined differently from any one R-ONU 100 by allowing the center wavelength of the optical signal to be converted within only 1 nm.

In addition, when the controlling unit 140 applies an arbitrary offset temperature to the initial set temperature to determine the current set temperature of the temperature setting unit 120, it is preferable that the offset temperature is determined within the operation range (in the above example, the third operation range) of the temperature setting unit 120 that corresponds to the initial external temperature. This is to avoid the wavelength overlap phenomenon with other R-ONUs 100 that generate the wavelengths of the optical signals depending upon the temperature belonging to other operation ranges (the first operation range or the second operation range) by allowing the wavelength of the optical signal generated by any one R-ONU 100 to be generated depending upon only the temperature belonging to, for example, the third operation range.

Figure 4:
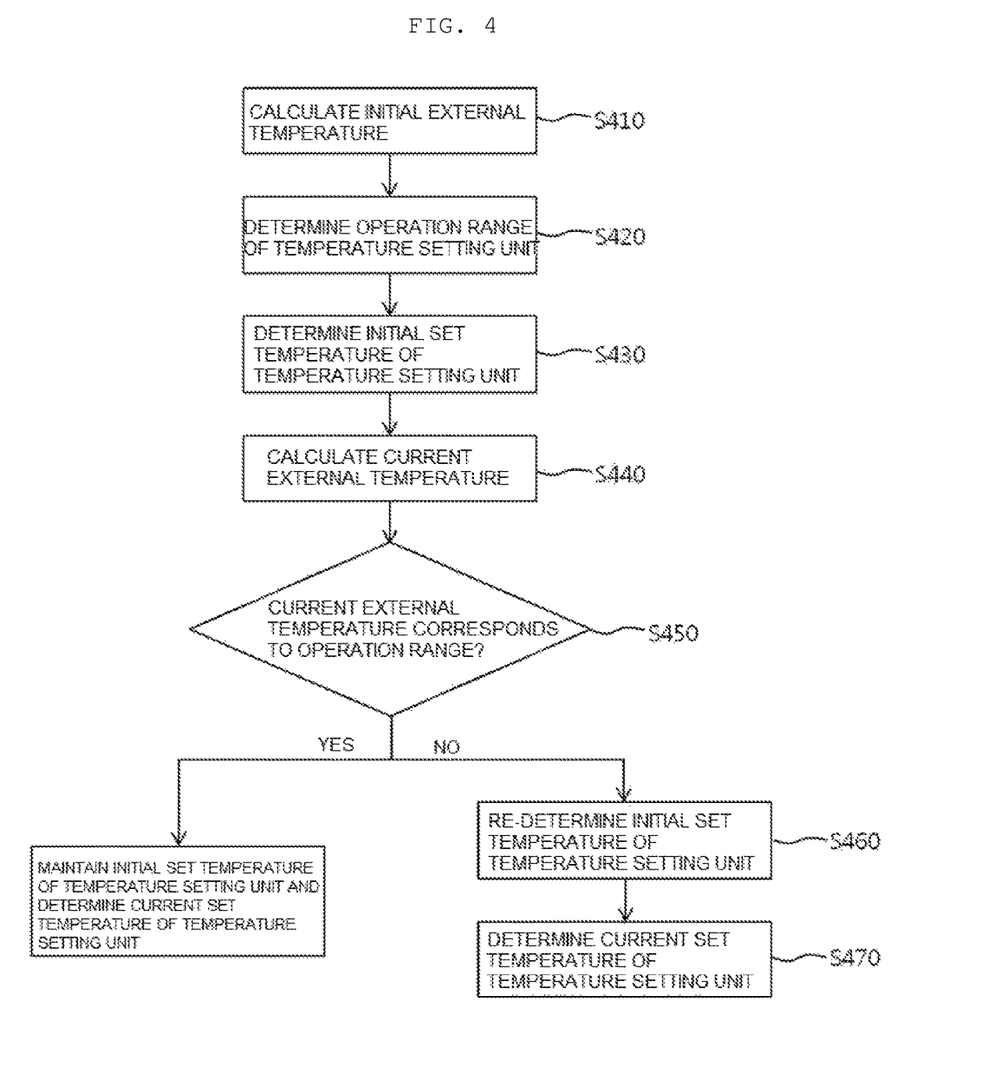
FIG. 4 is a flow chart illustrating a method for converting a wavelength of an optical signal according to a third exemplary embodiment of the present invention.

FIG. 4 is a flow chart illustrating a method for converting a wavelength of an optical signal according to a third exemplary embodiment of the present invention.

Referring to FIG. 4, in a method for converting a wavelength of an optical signal according to a third exemplary embodiment of the present invention, first, the controlling unit 140 calculates the initial external temperature sensed by the temperature sensor 130 (S410), and then determines the operation range of the temperature setting unit 120 that corresponds to the initial external temperature (S420). Next, the controlling unit 140 determines an arbitrary temperature belonging to the operation range of the temperature setting unit 120 that corresponds to the initial external temperature, as the initial set temperature of the temperature setting unit 120 (S430). Since the operations of the method for converting the wavelength of the optical signal according to the third exemplary embodiment of the present invention performed in this order are the same as the operations (S210 to S230) described above in the method for converting the wavelength of the optical signal according to the first exemplary embodiment of the present invention, a detailed description thereof will be omitted.

In the method for converting the wavelength of the optical signal according to the third exemplary embodiment of the present invention, after S430, an operation (S440) of calculating, by the controlling unit 140, a current external temperature sensed by the temperature sensor 130 is performed. The operation (S440) is performed to change the initial set temperature of the temperature setting unit 120 which is performed in the operation (S430) when the current external temperature is out of the operation range of the temperature setting unit 120 that corresponds to the initial external temperature in the operation (S420).

Accordingly, after S440, the controlling unit 140 determines whether or not the current external temperature corresponds to the operation range of the temperature setting unit 120 that corresponds to the initial external temperature (S450).

As a result of determination of the controlling unit 140, when it is determined that the current external temperature corresponds to the same operation range as the operation range of the temperature setting unit 120 that corresponds to the initial external temperature, the controlling unit 140 maintains the initial set temperature of the temperature setting unit 120 determined in the operation (S430), and after S430, when the RF signal is input to the controlling unit 140 from the outside, the controlling unit 140 determines a temperature obtained by applying an arbitrary offset temperature to the initial set temperature determined in the operation (S430) as the current set temperature of the temperature setting unit 120 to allow the light generating unit 110 connected to the temperature setting unit 120 to generate an optical signal having a wavelength according to the current set temperature.

Here, it is preferable that the offset temperature applied to the initial set temperature of the temperature setting unit 120 by the controlling unit 140 is within 10° C., and this is to minimize a phenomenon that a wavelength of an optical signal generated by any one R-ONU 100 overlaps with a wavelength of an optical signal generated by the R-ONU 100 having an initial set temperature which is determined differently from any one R-ONU 100 by allowing the center wavelength of the optical signal to be converted within only 1 nm.

In addition, when the controlling unit 140 applies an arbitrary offset temperature to the initial set temperature to determine the current set temperature of the temperature setting unit 120, it is preferable that the offset temperature is determined within the operation range (for example, the third operation range) of the temperature setting unit 120 that corresponds to the initial external temperature. This is to avoid the wavelength overlap phenomenon with other R-ONUs 100 that generate the wavelengths of the optical signals depending upon the temperature belonging to other operation ranges (the first operation range or the second operation range) by allowing the wavelength of the optical signal generated by any one R-ONU 100 to be generated depending upon only the temperature belonging to, for example, the third operation range.

Meanwhile, as a result of determination of the controlling unit 140, when it is determined that the current external temperature corresponds to the operation range which is different from the operation range of the temperature setting unit 120 that corresponds to the initial external temperature, the controlling unit 140 re-determines an arbitrary temperature belonging to the different operation range as the initial set temperature of the temperature setting unit 120 (S460).

For example, it may be assumed that the initial external temperature calculated in the operation (S410) by the controlling unit 140 is 15° C., the controlling unit 140 determines the operation range of the temperature setting unit 120 as the third operation range in the operation (S420) accordingly, and the controlling unit 140 determines the initial set temperature of the temperature setting unit 120 as 25° C. in the operation (S430) accordingly. In addition, when it is assumed that the controlling unit 140 calculates the current external temperature as 10° C. or 35° C. in the operation (S440), the controlling unit 140 may perform the same determination operation as the operation (S450).

When it is assumed that the controlling unit 140 calculates the current external temperature as 10° C. in the operation (S440), the controlling unit 140 may determine that the current external temperature (10° C.) belongs to the third operation range, which is the operation range of the temperature setting unit 120 that corresponds to the initial external temperature (15° C.) through the operation (S450).

On the other hand, when it is assumed that the controlling unit 140 calculates the current external temperature as 35° C. in the operation (S440), the controlling unit 140 may determine that the current external temperature (35° C.) belongs to the second operation range, not the third operation range, which is the operation range of the temperature setting unit 120 that corresponds to the initial external temperature (15° C.) through the operation (S450). In this case, the controlling unit 140 re-determines an arbitrary temperature (e.g., 40° C.) belonging to the second operation range as the initial set temperature of the temperature setting unit 120, which means that the reference wavelength of the optical signal generated by the light generating unit 110 is converted. That is, depending upon the initial set temperature (25° C.) of the temperature setting unit 120 which is determined in the operation (S430), the center wavelength λc in the light generating unit 110 is the reference wavelength, but depending upon the initial set temperature (40° C.) which is re-determined in the operation (S460), the center wavelength λc+1.5 nm in the light generating unit 110 is the reference wavelength.

Through the operations as described above, the initial set temperature of the temperature setting unit 120 is re-determined, thereby making it possible to minimize the phenomenon that the wavelengths generated by the plurality of R-ONUs 100 overlap with each other even in a case in which the external temperature is changed.

After S460, when an RF signal is input to the controlling unit 140 from the outside, the controlling unit 140 determines a temperature obtained by applying an arbitrary offset temperature to the initial set temperature which is re-determined in the operation (S460) as the current set temperature of the temperature setting unit 120 to cause the light generating unit 110 connected to the temperature setting unit 120 to generate an optical signal having a wavelength according to the current set temperature (S470).

If the controlling unit 140 re-determines the initial set temperature of the temperature setting unit 120 included in the R-ONU 100 of a subscriber side of a first channel as 40° C. after performing the operation (S460), the controlling unit 140 may apply an offset temperature of +5° C. to the initial set temperature. Accordingly, the current set temperature of the temperature setting unit 120 becomes 45° C., and as a result, the center wavelength of the optical signal generated by the light generating unit 110 becomes λc+2 nm.

Here, it is preferable that the offset temperature applied to the initial set temperature of the temperature setting unit 120 by the controlling unit 140 is within 10° C., and this is to minimize a phenomenon that a wavelength of an optical signal generated by any one R-ONU 100 overlaps with a wavelength of an optical signal generated by the R-ONU 100 having an initial set temperature which is determined differently from any one R-ONU 100 by allowing the center wavelength of the optical signal to be converted within only 1 nm.

In addition, when the controlling unit 140 applies an arbitrary offset temperature to the initial set temperature to determine the current set temperature of the temperature setting unit 120, it is preferable that the offset temperature is determined within the operation range (in the above example, the second operation range) of the temperature setting unit 120 that corresponds to the current external temperature. This is to avoid the wavelength overlap phenomenon with other R-ONUs 100 that generate the wavelengths of the optical signals depending upon the temperature belonging to other operation ranges (the first operation range or the third operation range) by allowing the wavelength of the optical signal generated by any one R-ONU 100 to be generated depending upon only the temperature belonging to, for example, the second operation range.

As described above, according to the exemplary embodiments of the present invention, the controlling unit 140 arbitrarily determines the current set temperature of the temperature setting unit 120 to cause the light generating unit 110 connected to the temperature setting unit 120 to generate the optical signal having the wavelength according to the current set temperature, thereby making it possible to effectively reduce the wavelength overlap phenomenon that may occur when the plurality of R-ONUs 100 in the passive optical network simultaneously transmit the optical signals.

Further, according to the exemplary embodiments of the present invention, the controlling unit 140 is configured to determine the current set temperature of the temperature setting unit 120 based on the temperature outside the R-ONU 100 (i.e., the external temperature), such that the temperature setting unit 120 does not need to change the setting temperature to a large extent for setting the temperature of the light generating unit 110, whereby there is less concern that the temperature setting unit 120 is damaged or malfunctioned, thereby making it possible to ensure the lifetime of the temperature setting unit 120 and the R-ONU 100.

According to the exemplary embodiments of the present invention, the controlling unit arbitrarily determines the current set temperature of the temperature setting unit to cause the light generating unit connected to the temperature setting unit to generate the optical signal having the wavelength according to the current set temperature, thereby making it possible to effectively reduce the wavelength overlap phenomenon that may occur when the plurality of R-ONUs in the passive optical network simultaneously transmit the optical signals.

In addition, according to the exemplary embodiment of the present invention, the controlling unit is configured to determine the current set temperature of the temperature setting unit based on the temperature outside the R-ONU, such that the temperature setting unit does not need to change the setting temperature to a large extent for setting the temperature of the light generating unit, whereby there is less concern that the temperature setting unit is damaged or malfunctioned, thereby making it possible to ensure the lifetime of the temperature setting unit and the R-ONU.

While the present invention has been described with reference to the exemplary embodiments and the accompanying drawings, it is not limited to the above-mentioned exemplary embodiments, but may be variously modified and altered from the above description by those skilled in the art to which the present invention pertains. It is to be understood that the technical idea of the present invention should be understood only in accordance with the appended claims, and all of its equivalents or equivalent modifications fall within the technical scope of the present invention.

What is claimed is:

1. A method for converting a wavelength of an optical signal by a controlling unit included in an R-ONU in a passive optical network, the method comprising:
   (a) calculating an initial external temperature sensed by a temperature sensor;
   (b) determining an operation range of a temperature setting unit that corresponds to the initial external temperature;
   (c) determining an arbitrary temperature belonging to the operation range of the temperature setting unit that corresponds to the initial external temperature, as an initial set temperature of the temperature setting unit; and
   (d) when a radio frequency (RF) signal is input from the outside, determining a temperature obtained by applying an arbitrary offset temperature to the initial set temperature as a current set temperature of the temperature setting unit to cause a light generating unit connected to the temperature setting unit to generate an optical signal having a wavelength according to the current set temperature.

2. The method of claim 1, wherein in step (d), the current set temperature of the temperature setting unit is determined within the operation range of the temperature setting unit that corresponds to the initial external temperature.

3. A method for converting a wavelength of an optical signal by a controlling unit included in an R-ONU in a passive optical network, the method comprising:
   (a) calculating an initial external temperature sensed by a temperature sensor;
   (b) determining an operation range of a temperature setting unit that corresponds to the initial external temperature;
   (c) determining an arbitrary temperature belonging to the operation range of the temperature setting unit that corresponds to the initial external temperature, as an initial set temperature of the temperature setting unit;
   (d) calculating a current external temperature sensed by the temperature sensor;
   (e) determining whether or not a difference between the initial external temperature and the current external temperature is a predetermined value or more;
   (f) when it is determined that the difference between the initial external temperature and the current external temperature is the predetermined value or more, re-determining an arbitrary different temperature belonging to the operation range of the temperature setting unit as an initial set temperature; and
   (g) when a radio frequency (RF) signal is input from the outside, determining a temperature obtained by applying an arbitrary offset temperature to the initial set temperature which is re-determined in the operation (f) as a current set temperature of the temperature setting unit to cause a light generating unit connected to the temperature setting unit to generate an optical signal having a wavelength according to the current set temperature.

4. The method of claim 3, wherein in step (g), the current set temperature of the temperature setting unit is determined within the operation range of the temperature setting unit that corresponds to the initial external temperature.

5. A method for converting a wavelength of an optical signal by a controlling unit included in an R-ONU in a passive optical network, the method comprising:
   (a) calculating an initial external temperature sensed by a temperature sensor;
   (b) determining an operation range of a temperature setting unit that corresponds to the initial external temperature;
   (c) determining an arbitrary temperature belonging to the operation range of the temperature setting unit that corresponds to the initial external temperature, as an initial set temperature of the temperature setting unit;
   (d) calculating a current external temperature sensed by the temperature sensor;
   (e) determining whether or not the current external temperature corresponds to the operation range of the temperature setting unit that corresponds to the initial external temperature;
   (f) when it is determined that the current external temperature corresponds to an operation range which is different from the operation range of the temperature setting unit that corresponds to the initial external temperature, re-determining an arbitrary temperature belonging to the different operation range as an initial set temperature of the temperature setting unit; and
   (g) when a radio frequency (RF) signal is input from the outside, determining a temperature obtained by applying an arbitrary offset temperature to the initial set temperature which is re-determined in the operation (f) as a current set temperature of the temperature setting unit to cause a light generating unit connected to the temperature setting unit to generate an optical signal having a wavelength according to the current set temperature.

6. The method of claim 5, wherein in step (g), the current set temperature of the temperature setting unit is determined within the operation range of the temperature setting unit that corresponds to the current external temperature.

* * * * *